United States Patent [19]

Cyphelly

[11] 3,767,213

[45] Oct. 23, 1973

[54] HYDROSTATIC SHAFT SEAL

[76] Inventor: Ivan Jaroslav Cyphelly, 8128 Hinteregg, Switzerland

[22] Filed: Aug. 23, 1972

[21] Appl. No.: 283,043

[30] Foreign Application Priority Data
Dec. 7, 1971 Switzerland.................... 17836/71

[52] U.S. Cl....................... 277/30, 277/74, 277/79, 277/83
[51] Int. Cl.......................... B65d 53/00, F16j 15/16
[58] Field of Search ................... 277/30, 32, 74, 79, 277/83

[56] References Cited
UNITED STATES PATENTS

| | | | |
|---|---|---|---|
| 3,093,382 | 6/1963 | Macks................................. | 277/74 |
| 3,272,516 | 9/1966 | Hoffman............................. | 277/32 |
| 3,685,842 | 8/1972 | Cyphelly............................. | 277/74 |

Primary Examiner—Samuel B. Rothberg
Assistant Examiner—Robert L. Smith
Attorney—David Toren et al.

[57] ABSTRACT

A hydrostatic shaft seal for a rotatable shaft extending through an opening in a housing includes a seal ring substantially enclosed in a stationary seal ring casing consisting of seat plates. The seat plates are positioned in the housing opening with operating choke gaps formed between opposite axial end surfaces of the seal ring and the adjacent portions of the seat plates. One of these gaps is in communication with a space containing hydraulic fluid under operating pressure, and the other gap is in communication with a space at a relatively lower pressure. The two gaps are connected in series to open and close in opposition. Elastic seal elements are provided between the seal ring and the shaft to provide for relative axial displacement of the seal ring under the oppositely acting hydraulic pressures. The seal ring can be a single element or a two part element, and the hydrostatic shaft seal can be designed for feeding hydraulic fluid at operating pressure from the housing to the shaft, with the space under operating hydraulic pressure being in communication with the shaft and the housing through pressure medium lines. A cap is located within the opening in the housing and covers one of the sides of the seat plates which side extends transversely of the shaft. Elastic seal elements are provided between the cap and the juxtaposed surfaces of the seal plate and the combination of the elastic seals, the cap and the seal plate form at least one compensation space. A bore or passage through the shaft seal connects the compensation space with the hydraulic pressure medium so that the force provided by the pressure of the hydraulic pressure medium in the compensation space opposes the deformation forces provided by the hydraulic operating pressure.

7 Claims, 4 Drawing Figures

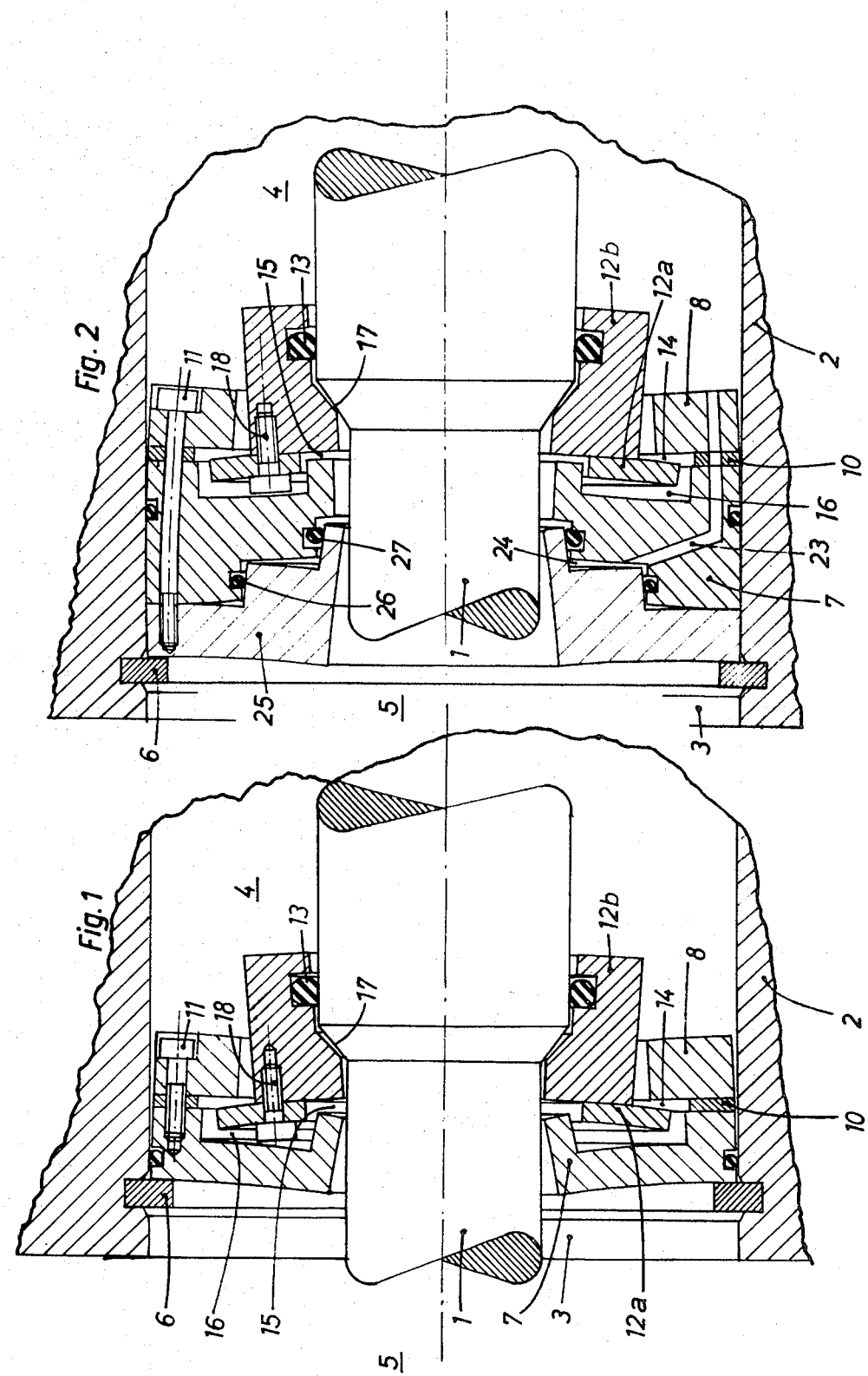

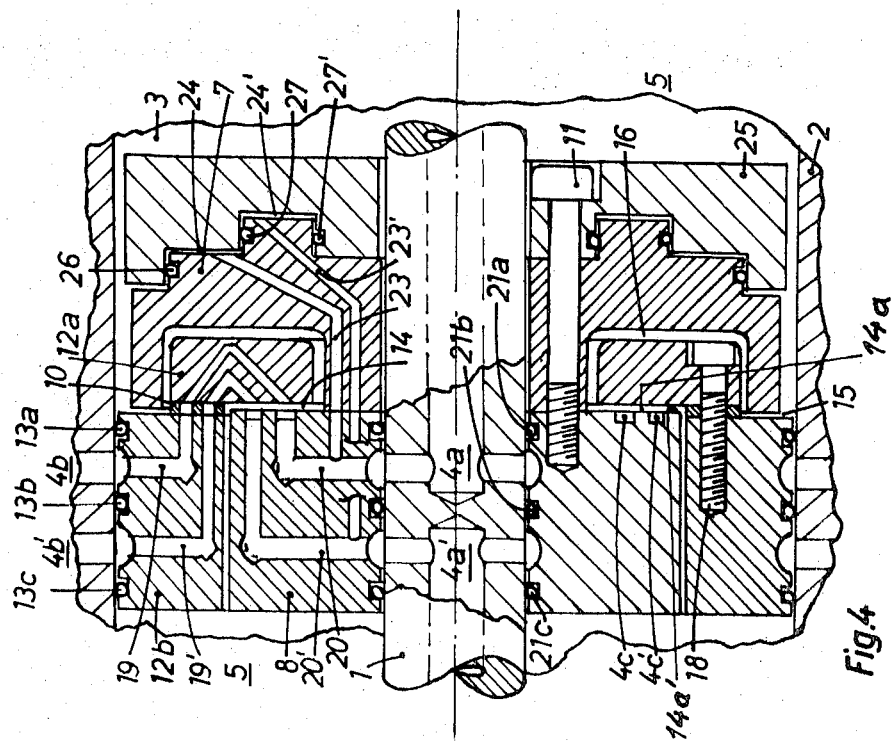
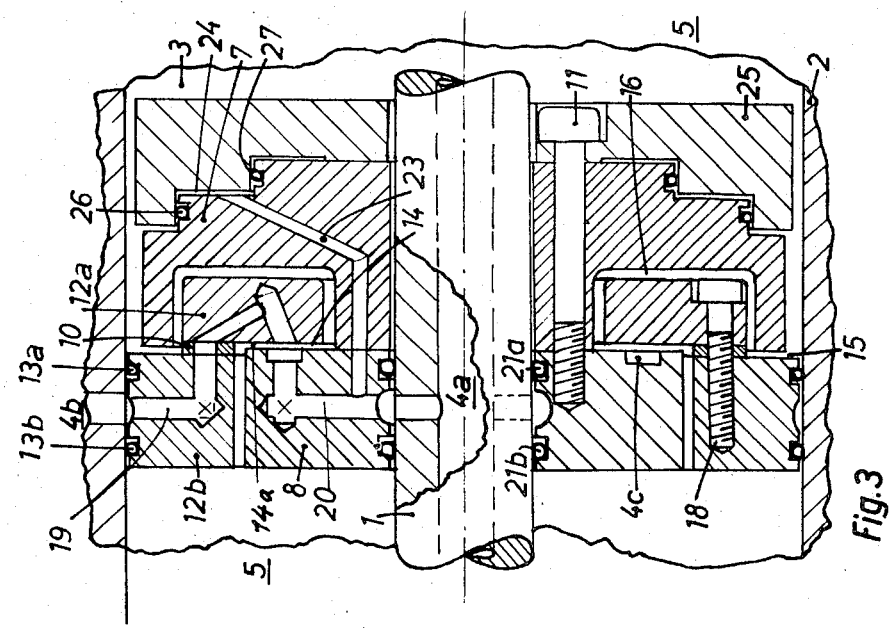

HYDROSTATIC SHAFT SEAL

SUMMARY OF THE INVENTION

The present invention is directed to a hydrostatic shaft seal and, more particularly, it concerns an improvement on the hydrostatic shaft seal disclosed in the applicant's U.S. Pat. application Ser. No. 79,541 filed Oct. 9, 1970 and now U.S. Pat. No. 3,685,842.

With high operating pressures of the hydraulic pressure medium a deformation of the sealing parts of a hydrostatic shaft seal may occur resulting in an increase of leakage of the pressure medium through the seal.

Therefore, it is a primary object of the present invention to limit the leakage to a minimum value in a shaft seal operating at high hydraulic pressure by providing a counter-pressure at the structural elements of the shaft seal which are deformed by the operating pressure so that the width of the choke gaps within the seal remains through the whole range of operating pressures, or even decreases with increasing operating pressure.

In a preferred embodiment the hydrostatic shaft seal has one of its seat plates covered by a cap with elastic seal elements positioned between the seat plate and the cap. The combiantion of the cover, the seat plate and the elastic seal elements forms at least one compensation space. Further, a pressure medium line is provided between each compensation space and the hydraulic pressure medium, whereby the forces developed by the pressure of the hydraulic pressure medium in the compensation space oppose the deformation forces caused by the hydraulic operating pressure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The accompanying drawings show by way of example only, embodiments of the invention, in which, FIG. 1 is an axial sectional view of the hydraulic shaft seal disclosed in U.S. Pat. application Ser. No. 79,541 with the seal shown deformed by pressure forces;

FIG. 2 is an axial sectional view of a hydraulic shaft seal embodying the present invention and including means for counteracting the deforming pressure forces; and FIGS. 3 and 4 are axial section views similar to FIG. 2 of other embodiments of the invention serving as pressure medium feedthroughs, and including means to counteract the deforming pressure forces.

DETAILED DESCRIPTION OF THE INVENTION

In particular reference to FIG. 1, a shaft 1 extends through an opening 3 in housing 2 between a high-pressure space 4 and a low-pressure space 5 with a pressure differential between the two. The leakage flow between the two spaces is reduced to a minimum amount by the seal which is inserted in the opening 3 and is secured by a lock ring 6. The seal proper consists of stationary casing parts, namely, seat plates 7 and 8, and a spacer plate 10, all of these parts are held together by bolts, such as 11 or similar means, and a two part seal ring 12a, 12b which is enclosed by the casing parts and connected with the shaft 1 by way of an elastic-seal isolating member 13 so that the seal can transmit torque and at the same time seal. The elastic-seal isolating member 13 permits a slight axial displacement and wobble of the seal ring 12a and 12b. The axial clearance of the seal ring 12a, 12b, between the chamber casing parts 7 and 8, is determined by the spacer plate 10. Accordingly, two operating choke gaps 14, 15 disposed in a common plane are created between the seal ring 12a, 12b and the seat plates 7, 8 with the gap 14 on the high pressure side and the gap 15 on the leak or low pressure side, forming the inlet and discharge, respectively, of an intermediate pressure space 16. The two parts 12a and 12b of the seal ring are held together by bolts, such as 18 or equivalent means. The axial clearance between the seal ring 12a, 12b and the seat plates 7, 8 is determined by the spacer plate 10.

The operation of the arrangement in FIG. 1 can be described as follows: The choke gaps 14 and 15 form a pressure divider, the intermediate pressure of which acts, due to a reduction 17 in shaft diameter, on a larger area than does the operating pressure opposing it. As a result, a force equilibrium between the operating pressure force and the intermediate pressure force becomes possible for a certain axial position of the seal ring 12a, 12b.

If the seal ring 12a, 12b is pushed out of this equilibrium position against the seat plate 7, a pressure increase is generated in the intermediate pressure space 16 by the closing of the choke gap 15, on the leak side, and the opening of the choke gap 14, on the higher pressure side, in such a manner that a force opposing the disturbance is generated and the seal ring 12a, 12b is pushed back into the equilibrium position. In case of an excursion in the other direction, the same mechanism likewise returns the seal ring to the same position. Therefore, the equilibrium position is a stable rest point of the system.

In the embodiment of FIG. 1, the required axial clearance of the seal ring 12a, 12b in the casing is a few hundredths of a millimeter. With the two seal ring parts 12a, 12b in juxtaposition, the clearance is easily achieved by means of the spacer plate 10.

In FIG. 4 the hydraulic shaft seal is shown under the effect of a very high hydraulic operating pressure. As shown in an exaggerated manner, various elements of the shaft seal arrangement become deformed by the forces of the pressure medium which, in FIG. 1, is assumed to have a higher pressure in space 4 than in space 5. In particular, it may be seen that the choke gaps 14 and 15 are widely opened by the deforming forces thereby increasing the leakage of the hydraulic pressure medium to an undesirable and objectable extent.

The embodiment of the inventive shaft seal shown in FIG. 2, which at least partly compensates for the deformations shown in FIG. 1, has substantially the same structure as that of FIG. 1. However, one side of the seat plate 7 is covered or enclosed within the opening 3 by a cap 25 which is fixed to the seat plates 7 and 8 by means of bolts 11 or similar members. A pressure compensation space 24 is formed between seat plate 7 and cap 25, and the compensation space is radially defined by spaced elastic-seal members 26 and 27. The compensation space 24, which is located on the side turned away from the side of the control mechanism, is supplied with the pressure of the hydraulic pressure medium from space 4 by a pressure medium bore 23 connecting space 24 to space 4. The remaining elements are similar to that shown in FIG. 1 and, therefore, need not again be described.

In FIG. 2 the shaft seal is shown in the operating state, the operating pressure causing some of the elements to deform partly. The pressure supplied to compensation space 24 from space 4 prdouces a force acting on seat plate 7 which counteracts the deforming force of the pressure of space also acting on seat plate 7. Thus, a deformation of seat plate 7 for closing the gaps 14 and 15 is achieved, and a leakage increase is effectively avoided, or a decrease of leakage may even result. At the same time, cap 25 is deformed in the opposite sense. Due to the elastic-seal members 26 and 27 the compensation space 24 remains sealed in spite of opposite movement of seat plate 7 and cap 25.

In FIGS. 3 and 4 two embodiments of the inventive shaft seal are shown which are derived from the embodiment of FIG. 2. In these embodiments the shaft seal acts as a feedthrough for the hydraulic pressure medium between the shaft and the housing.

In the embodiment shown in FIG. 3, a high-pressure space 4a in rotating shaft 1 is connected to a high-pressure space 4b in housing 2. By means of the shaft seal any discharge of the pressure medium, subject to the operating pressure of the spaces 4a–4b, into the low-pressure spaces 5 formed between the shaft 1 and the housing 2, is reduced to the minimum while concurrently serving as a cushion and choke. The hydrostatic seal means of the present invention affords these features while it acts as a feedthrough for the operating hydraulic pressure. The feedthrough is formed by parts connected with the shaft 1, namely the seat plates 7 and 8, which parts are held together by bolts such as 11, or equivalent means, and by two-part seal ring 12a, 12b and spacer plate 10 which is connected with the housing 2 by way of the elastic-seal isolating means 13a and 13b. The seat plates 7, 8 are connected with the shaft 1 by way of elastic-seal isolating members 21a, 21b, so that the seat plates transmit torque and at the same time seal the high-pressure fluid preventing its leakage along the shaft into the low-pressure spaces 5. The elastic-seal isolating members 21a and 21b allow a slight axial displacement end wobble of the seat plates 7, 8. Between each part 12a and 12b of the seal ring and one of each seat plate 7 and 8, two operating choke gaps 14, 15 are created. These gaps are the gap 14 on the pressure side and the gap 15 on the leak side, which form the inlet and discharge, respectively, of an intermediate pressure space 16. Between the seat plate 8 and the seal ring 12a an additional pressure area limiting gap 14a is formed, so that the pressure space facing the seal ring 12a is confined to the annular slot 4c. The parts 12a and 12b of the seal ring are held together by bolts 18 or similar elements.

The operation of the arrangement shown in FIG. 3 is as follows: the choke gaps 14 and 15 form a pressure divider, the intermediate pressure of which acts upon a larger area than does the operating pressure opposing it as a result of the pressure area limiting gap 14a, according to the arrangement in the annular slot 4c, whereby an equilibrium of forces between the operating pressure force and the intermediate pressure force becomes possible for a defined axial position of the seat plates 7, 8.

If the seat plates 7, 8 are pushed out of this equilibrium position against the seal ring 12a, 12b, a pressure increase is generated in intermediate pressure space 16 by the closing of the gap 15 on the leak side and the opening of the operating choke gap 14 on the pressure side in such a manner that a force opposed to the disturbance is generated and the seat plates 7, 8 are pushed back into the equilibrium position. In case of an excursion in the other direction, the same mechanism operates to return the seat plates into the same position, the gap 15 being opened while the pressure drop closes the gap 14 and causes the return of the seat plates to the equilibrium position, that is, to the stable rest point of the system, wherein the pressure area limiting gap 14a does not participate in the control loop.

The main fluid flow, subject to the operating pressure, is conducted from the shaft passage or space 4a by way of a passage 20 in the seat plate 8 to the annular slot 4c, and is fed through a passage 19 in the seal ring parts 12a, 12b to its utilization point in the housing space 4b. This flow direction can, of course, be reversed. In FIG. 3, tightness is assured at the junction points of the housing and the shaft with the feedthrough conduit by the elastic seals 13a, 13b and 21a, 21b, respectively.

To counteract the pressure forces acting on the structural elements described above from resulting in an increase of the choke gap widths and a corresponding leakage increase, a cap 25 is provided covering or enclosing the seat plate 7 within the housing-opening and fixed to the seat plate by bolts 11. Cap 25 forms with seat plate 7 a compensation space 24 radially defined by elastic-seal members 26 and 27. In the present embodiment the pressure space is limited to the lines or conduit between high-pressure space 4a in shaft 1 and high-pressure space 4b in housing 2, that is, to passages 19, 20 and annular slot 4c. Therefore, to supply a compensating pressure to compensation space 24, a bore 23 connects compensation space 24 to passage 20.

The embodiment shown in FIG. 4 is similar to that of FIG. 3, however, the shaft 1 contains two separated high-pressure spaces 4a and 4a' each in communication with a different high-pressure space 4b, 4b' in housing 2 by way of separate conduit lines, namely, line portions 19, 20 and 19', 20', and annular slots 4c and 4c', respectively. Thus the radially inner annular slot 4c separates gap 14 from a first pressure area limiting gap 14a, and the outer annular slot 4c' separates the gap 14a from a second pressure area limiting gap 14a'. In a corresponding manner, there are two compensation spaces 24 and 24' between seat plate 7 and cap 25, these compensation spaces being radially defined by three elastic-seal members 26, 27 and 27'. Each of the compensation spaces is associated with a different one of the feedthrough conduits consisting of the portions 19, 4c, 20 and 19', 4c', 20', respectively. Accordingly, compensation space 24 is connected to line portion 20 by way of a bore 24, and compensation space 24' is connected to line portion 20' by way of a bore 23'.

While specific embodiments of the invention have been shown and described in detail to illustrate the aplication of the inventive principles, it will be understood that the invention may be embodied otherwise without departing from such principles.

What is claimed is:

1. A hydrostatic shaft seal for an axially extending shaft disposed within an opening in a housing with said shaft spaced within the opening radially inwardly from said housing, said shaft and said housing being relatively rotatable, said shaft seal being subjected to operating hydraulic pressures and including seal ring means substantially enclosed within said opening by said housing, seat plate means positioned within the opening in said housing and cooperating with said seal ring means and said seat plate means comprising a pair of annular seat plates, means for maintaining one of said seal ring means and said pair of seat plates in fixed rotary position relative to said shaft for permitting relative axial displacement thereof on said shaft, said seal ring means having a pair of annular sealing faces directed in opposite axial directions of said shaft and each sealing face defining with a respective face of a different one of said pair of annular seat plates a first choke gap and a second choke gap respectively, said first choke gap arranged to be subjected to a higher hydraulic operating pressure than the hydraulic operating pressure to which said second gap is subjected, and said seal ring means cooperating with said seat plate means and forming a passage for connecting said first and second choke gaps in series with each other so that said first and second choke gaps open and close in opposition, said seal ring means comprising two annular seal rings fixedly joined together with one said annular seal ring extending radially outwardly beyond the other said annular seal ring and the other said annular seal ring extending radially inwardly from the one said annular seal ring, said seal rings being juxtaposed to each other and said annular sealing faces extending in a common plane, one face of one of said seal rings extending transversely of the axial direction of said shaft and facing in one axial direction of said shaft and defining one of said annular sealing faces, and one face of the other of said seal rings extending transversely of the axial direction of said shaft and facing in the opposite axial direction of said shaft and defining the other said annular sealing face so that said first and second gaps lie in a common plane, and a spacer plate providing a clearance between one of said pair of seal rings and said pair of seat plates, wherein the improvement comprises a cap covering one of the surfaces of one of said seat plates, elastic seal elements disposed in spaced relationship and extending between said cap and the surface of the one of said seat plates which it covers, the combination of said cap, the surface of one of the seat plates covered by said cap and said elastic seal elements combining to form at least one compensation space therebetween, said shaft seal including a passageway communicating between said compensation space and a source of hydraulic pressure medium so that the forces provided by the pressure of the hydraulic pressure medium in said compensation space opposes the deformation forces of the hydraulic operating pressure acting on said shaft seal.

2. A hydrostatic shaft seal, as set forth in claim 1, wherein said spacer plate is interposed in the axial direction of said shaft between said seat plates.

3. A hydrostatic shaft seal, as set forth in claim 1, wherein said spacer plate is interposed in the axial direction of said shaft between said seal rings.

4. A hydrostatic shaft seal, as set forth in claim 1, wherein said means for permitting relative axial displacement includes elastic seal elements.

5. A hydrostatic shaft seal, as set forth in claim 1, wherein said seal ring means and said seat plate means combined to form a passage providing for feedthrough of said hydraulic pressure medium from said housing to said shaft, said seal ring means and said seat plate means further forming a third choke gap, said third choke gap serving as a pressure area limiting gap and located in the common plate of said first and second choke gaps and an annular slot-shaped pressure space separating said thrid choke gap from the adjacent first choke gap, and further forming pressure medium lines connecting said slot-shaped space with said shaft and said housing.

6. A hydrostatic shaft seal, as set forth in claim 5, including at least one additional said annular slot-shaped pressure space located in the common plane of said first and second choke gaps and in radially spaced relationship from said annular slot-shaped pressure space separating said third choke gap from the adjacent said first choke gap, a number of said compensation spaces provided between the combination of said cap, the surface of the one of said seat plates covered by said cap and said elastic seal elements corresponding to the number of said annular slot-shaped pressure spaces, and each of said compensation spaces associated with a different one of said annular slot-shaped pressure spaces.

7. A hydrstatic shaft seal, as set forth in claim 1, wherein said cap extends transversely of the axial direction of said shaft and covers the surface of the one of said seat plates disposed in spaced relationship from the other said seat plate, and said cover being located within the opening in said housing and extending raidally outwardly between said shaft and said housing.

* * * * *